United States Patent
Jang

(10) Patent No.: US 10,785,409 B2
(45) Date of Patent: Sep. 22, 2020

(54) ELECTRONIC DEVICE COMBINING PLURALITY OF IMAGES BASED ON IMAGE BRIGHTNESS AND METHOD THEREFOR

(71) Applicant: Samsung Electronics Co., Ltd, Suwon-si (KR)

(72) Inventor: Soongeun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 16/159,320

(22) Filed: Oct. 12, 2018

(65) Prior Publication Data

US 2019/0116313 A1 Apr. 18, 2019

(30) Foreign Application Priority Data

Oct. 13, 2017 (KR) ........................ 10-2017-0132972

(51) Int. Cl.
*H04N 5/232* (2006.01)
*H04N 5/235* (2006.01)
(Continued)

(52) U.S. Cl.
CPC ........... *H04N 5/23232* (2013.01); *G06T 5/50* (2013.01); *G06T 7/70* (2017.01); *H04N 5/2173* (2013.01);
(Continued)

(58) Field of Classification Search
CPC .... H04N 5/23232; H04N 9/045; H04N 5/238; H04N 5/2258; H04N 5/2173;
(Continued)

(56) References Cited

U.S. PATENT DOCUMENTS 9,185,291 B1 11/2015 Shabtay et al.
9,538,152 B2 1/2017 Shabtay et al.
(Continued)

FOREIGN PATENT DOCUMENTS

EP 2940658 A1 11/2015
WO 2017/171412 A2 10/2017

OTHER PUBLICATIONS

European Search Report dated Mar. 8, 2019 in connection with European Patent Application No. 18 20 0234, 11 pages.

*Primary Examiner* — Lin Ye
*Assistant Examiner* — Chang T Nguyen

(57) ABSTRACT

Various embodiments of the present disclosure relate to an electronic device that combines a plurality of images. The electronic device may include a first camera including a first view angle, a second camera including a second view angle that is smaller than the first view angle, a memory, and a processor, and the processor obtains a first image including a first brightness and corresponding to an external object, using the first camera, obtains a plurality of second images including a second brightness and corresponding to the external object, using the second camera, generates an image that is corrected to include a brightness corresponding to the first brightness, based at least on the plurality of second images including the second brightness, and generates a composite image corresponding to the external object, based at least on at least a part of the first image including the first brightness and at least a part of the corrected image. Also, other embodiments are possible.

18 Claims, 11 Drawing Sheets

(51) Int. Cl.
  *H04N 5/217*   (2011.01)
  *H04N 5/225*   (2006.01)
  *H04N 5/238*   (2006.01)
  *H04N 9/04*    (2006.01)
  *G06T 5/50*    (2006.01)
  *G06T 7/70*    (2017.01)
  *H04N 5/357*   (2011.01)

(52) U.S. Cl.
  CPC ........... *H04N 5/2258* (2013.01); *H04N 5/238* (2013.01); *H04N 5/2351* (2013.01); *H04N 5/2353* (2013.01); *H04N 5/357* (2013.01); *H04N 9/045* (2013.01)

(58) Field of Classification Search
  CPC .... H04N 5/357; H04N 5/2353; H04N 5/2351; H04N 5/2355; H04N 5/217; G06T 5/50; G06T 7/70
  USPC ...................................................... 348/222.1
  See application file for complete search history.

(56) References Cited

U.S. PATENT DOCUMENTS

| | | | |
|---|---|---|---|
| 2015/0339805 A1 | 11/2015 | Ohba et al. | |
| 2016/0028949 A1* | 1/2016 | Lee .................... | H04N 5/23296 348/218.1 |
| 2016/0182821 A1* | 6/2016 | Shabtay ................. | H04N 9/64 348/239 |
| 2017/0230585 A1 | 8/2017 | Nash et al. | |
| 2018/0070018 A1* | 3/2018 | Bian ...................... | H04N 5/247 |

\* cited by examiner

ELECTRONIC DEVICE COMBINING PLURALITY OF IMAGES BASED ON IMAGE BRIGHTNESS AND METHOD THEREFOR

CROSS-REFERENCE TO RELATED APPLICATION AND CLAIM OF PRIORITY

This application is based on and claims priority under 35 U.S.C. § 119 to Korean Patent Application No. 10-2017-0132972 filed on Oct. 13, 2017 in the Korean Intellectual Property Office, the disclosure of which is incorporated by reference herein in its entirety.

BACKGROUND

1. Field

The present disclosure relates to an electronic device and method for combining a plurality of images.

2. Description of Related Art

The above information is presented as background information only to assist with an understanding of the present disclosure. No determination has been made, and no assertion is made, as to whether any of the above might be applicable as prior art with regard to the present disclosure.

With the development of technologies, a portable electronic device may be equipped with a plurality of cameras. The plurality of cameras installed in the portable electronic device may have different magnification ratios such that the plurality of cameras are functionally variously utilized. Also, the disposition of the cameras having different magnification ratios may be determined based on the internal structure where the cameras are disposed.

The portable electronic devices equipped with the plurality of cameras may generate at least one image using the plurality of cameras, and may generate a single composite image based on the at least one image.

SUMMARY

A portable electronic device may include a plurality of cameras, and the plurality of cameras may have different magnification ratios. The cameras having different magnification ratios may receive different amounts of light during the same exposure time. The fact that the magnification ratios are different from each other may indicate that the cameras have different view angles, or may indicate that F-values (e.g., an F number, a value indicating the brightness of a camera lens, and a value indicating the amount of light received) corresponding to the cameras are different. When combining a plurality of images photographed by the plurality of cameras, the respective images to be combined need to be controlled to have similar brightness.

For example, the plurality of cameras may be divided as a first camera and a second camera. The amount of light received via the first camera may be two times larger than the amount of light received via the second camera. The first camera may generate a first image, and the second camera may generate a second image. The portable electronic device may determine the number of frames used for image correction, so as to control the first image and the second image to have similar brightness. For example, the first camera may correct the first image based on frames (e.g., two frames), the number of which is a first value. Compared with the first camera, the second camera may correct the second image based on frames (e.g., four frames), the number of which is two times larger than the first value. Generally, when the amount of light received is half of the other, the number of frames that the portable electronic device may need for compositing may be two times larger than the other.

According to various embodiments, the portable electronic device may combine a plurality of images based on frames, the number of which is smaller than the number of frames theoretically used. According to various embodiments, the portable electronic device may generate a composite image based on frames, the number of which is smaller than the number of frames theoretically used, and thus, the memory and the processing time expended for image compositing may be reduced.

An electronic device according to various embodiments of the present disclosure may include a first camera having a first view angle, a second camera having a second view angle that is smaller than the first view angle, a memory, and a processor, and the processor may obtain a first image having a first brightness and corresponding to an external object, using the first camera, may obtain a plurality of second images having a second brightness and corresponding to the external object, using the second camera, may generate an image that is corrected to have a brightness corresponding to the first brightness based at least on the plurality of second images having the second brightness, and may generate a composite image corresponding to the external object based at least on at least a part of the first image having the first brightness and at least a part of the corrected image.

A method according to various embodiments of the present disclosure may obtain a first image having a first brightness and corresponding to an external object using a first camera having a first view angle, may obtain a plurality of second images having a second brightness and corresponding to the external object using a second camera having a second view angle narrower than the first view angle, may generate an image that is corrected to have a brightness corresponding to the first brightness based at least on the plurality of second images having the second brightness, and may generate a composite image corresponding to the external object based at least on at least a part of the first image having the first brightness and at least a part of the corrected image.

Various embodiments of the present disclosure may control the number of frames used, when combining a plurality of images photographed by a plurality of cameras having different magnification ratios (e.g., view angles). Various embodiments of the present disclosure may combine the plurality of images using frames, the number of which is smaller than the number of frames set based on a difference between the brightness of the first image obtained by the first camera and the brightness of the second image obtained by the second camera. Various embodiments of the present disclosure may reduce the number of frames used for compositing, whereby the memory used for frame processing and frame processing time may be reduced. An electronic device according to various embodiments of the present disclosure may photograph images using a plurality of cameras having different view angles, and combine the photographed images, whereby the performance of the electronic device may be efficiently utilized.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
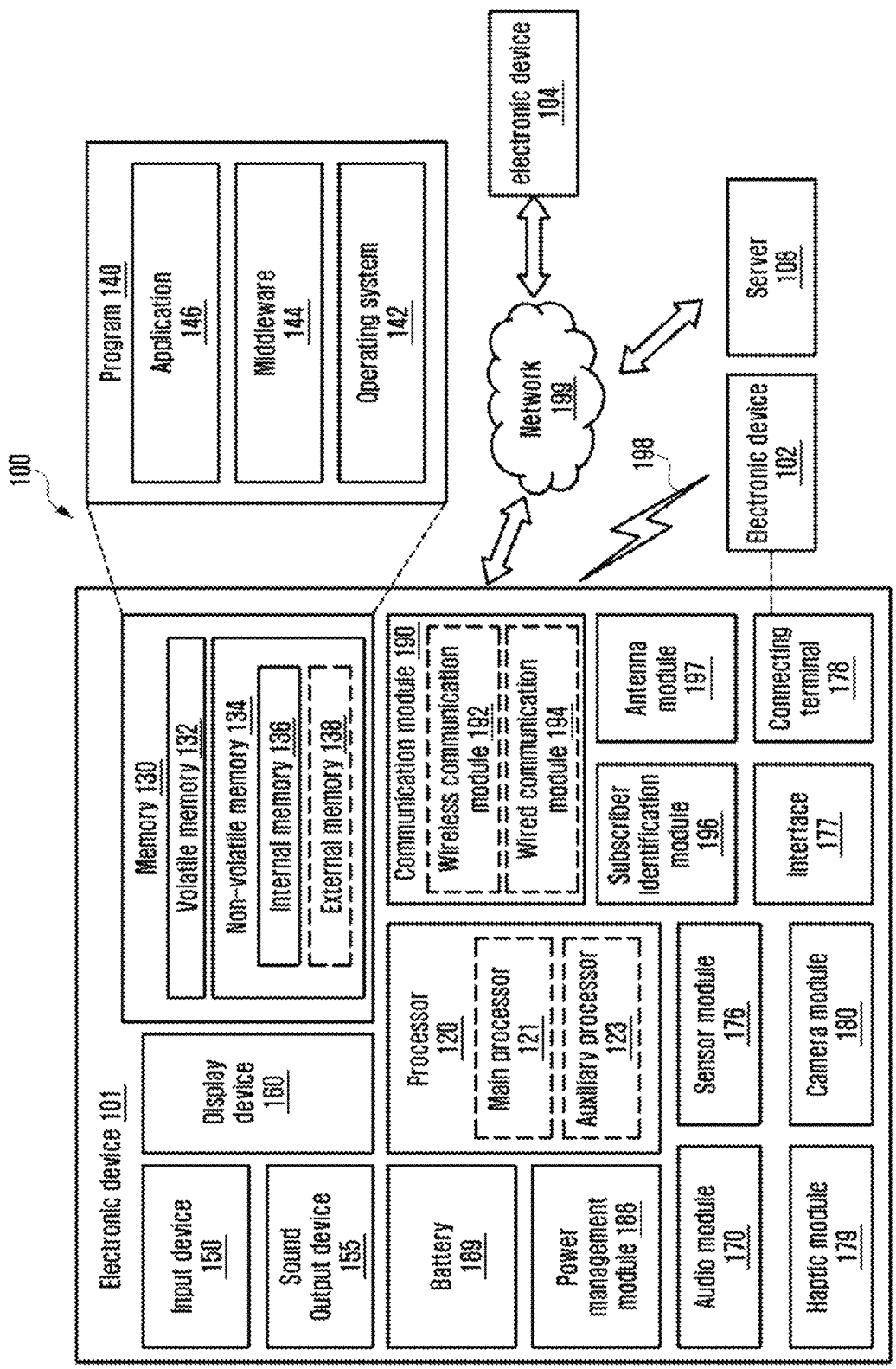
FIG. 1 illustrates a block diagram of an electronic device in a network environment according to various embodiments.

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
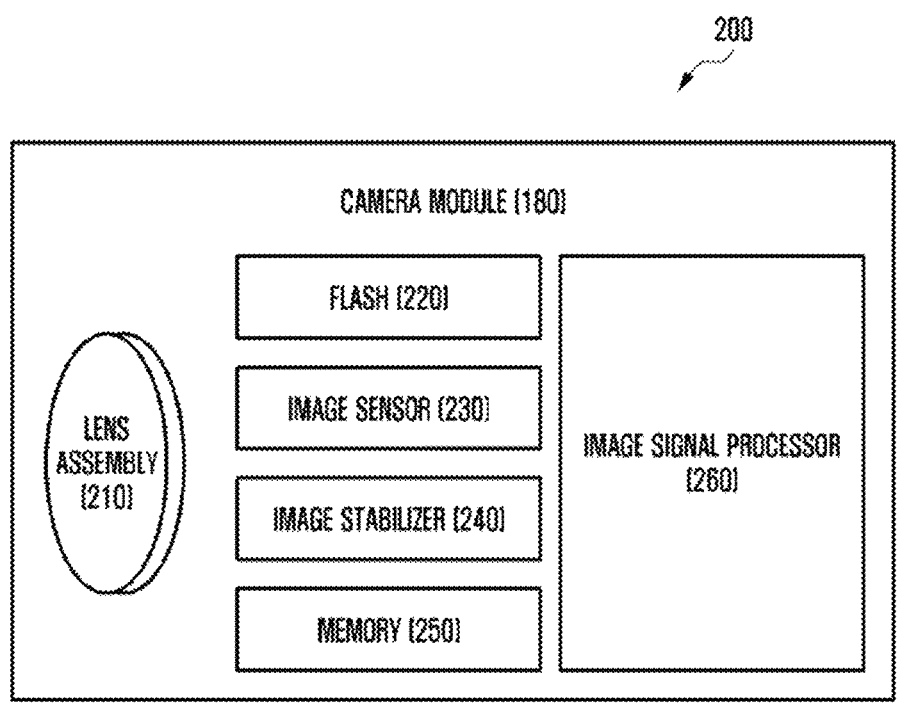
FIG. 2 illustrates a block diagram of a camera module according to various embodiments.

FIG. 2 illustrates a block diagram 200 of the camera module 180 according to various embodiments. Referring to FIG. 2, the camera module 180 may include a lens assembly $10, a flash $20, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as the image is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

According to various embodiments, a lens assembly 210 included in the camera module 180 may include at least one lens, and the lens may include a first lens having a first view angle and a second lens having a second view angle that is narrower than the first view angle. According to various embodiments, a single composite image may be generated by correcting and combining a first image corresponding to the first view angle and a second image corresponding to a second view angle.

Figure 3:
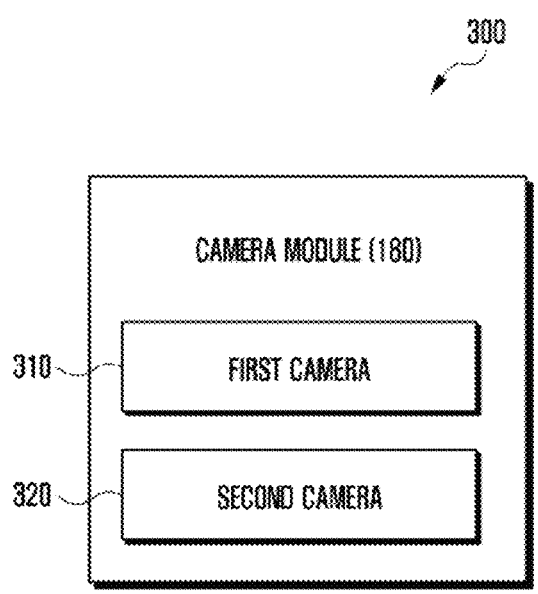
FIG. 3 illustrates a block diagram of the camera module including a plurality of cameras, according to various embodiments.

FIG. 3 illustrates a block diagram 300 of the camera module 180 including a plurality of cameras, according to various embodiments.

Referring to FIG. 3, the camera module 180 may include a first camera 310 and a second camera 320, and the first camera 310 and the second camera 320 may be synchronized. According to various embodiments, the first camera 310 and the second camera 320 may be included in an image sensor 230 included in the camera module 180, and the first camera 310 and the second camera 320 may operate under the control of the image sensor 230. According to various embodiments, each of the first camera 310 and the second camera 320 may be implemented as a structure including the elements of FIG. 2.

According to various embodiments, a processor (e.g., the processor 120 of FIG. 1) of an electronic device (e.g., the electronic device 101 of FIG. 1) may photograph an image using the first camera 310 and the second camera 320. For example, the processor 120 may photograph a first image using the first camera 310, and may photograph a second image using the second camera 320. The first camera 310 and the second camera 320 have different magnification ratios, and may have different F-values. The fact that the magnification ratios are different may indicate that the amounts of light received by the cameras during the same exposure time are different from each other. Generally, the F-value of a camera (e.g., an F number, a value indicating the brightness of a camera lens, or a value indicating the amount of light received) may be determined based on a lens of the camera. For example, the fact that the F-value is small may indicate that a large amount of light is received, and a photographed image may be displayed to be bright. According to various embodiments, the first camera 310 and the second camera 320 may have different view angles. Hereinafter, it is assumed that the F-value of the first camera 310 is smaller than the F-value of the second camera 320, the present disclosure is not limited thereto. The fact that an F-value is small may indicate that a large amount of light is received via a lens of a camera. The brightness of the first image corresponding to the first camera 310 may be brighter than that of the second image corresponding to the second camera 320. The processor 120 may identify a difference in the brightness between the first image and the second image, and may control the brightness of the second image to correspond to the brightness of the first image.

According to various embodiments, the processor 120 may determine the number of frames used to correct the second image, based on the difference in the brightness between the first image and the second image, and may correct the brightness of the second image based on the number of frames determined. According to various embodiments, the processor 120 may generate a composite image based on the first image and the second image of which the brightness is corrected.

According to various embodiments, the processor 120 may correct an image based on frames, the number of which is smaller than the number of frames theoretically used. According to various embodiments, the processor may reduce the number of frames to be processed, whereby the memory used for frame processing and frame processing time may be reduced.

An electronic device according to various embodiments may include a first camera having a first view angle, a second camera having a second view angle that is smaller than the first view angle, a memory, and a processor, and the processor may obtain a first image having a first brightness and corresponding to an external object, using the first camera, may obtain a plurality of second images having a second brightness and corresponding to the external object, using the second camera, may generate an image that is corrected to have a brightness corresponding to the first brightness based at least on the plurality of second images having the second brightness, and may generate a composite image corresponding to the external object based at least on at least a part of the first image having the first brightness and at least a part of the corrected image.

The processor of the electronic device according to various embodiments may obtain the first image based on a first exposure time set for the first camera, and may obtain the plurality of second images based on a second exposure time that is set for the second camera and is substantially the same as the first exposure time.

According to various embodiments, the first camera has a first f-number, the second camera has a second f-number which is greater than the first f-number, the processor is configured to determine a number of the plurality of second images based at least on a different between the first f-number and the second f-number, as at least a part of the obtaining the plurality of second images.

According to various embodiments, the processor may correct at least the part of the plurality of second images based at least on the number of the plurality of second images, as a part of the generating the corrected image.

According to various embodiments, the processor may correct a first noise corresponding to the first image using a first designated correction scheme, and may correct a second noise corresponding to at least the part of the plurality of second images using a second designated correction scheme.

According to various embodiments, the processor may perform: as at least a part of the first designated correction scheme, correcting the first noise using images, the number of which corresponds to a first value; and as at least a part of the second designated correction scheme, correcting the second noise using images, the number of which corresponds to a second value which is greater than the first value.

According to various embodiments, one of the first camera and the second camera is a camera for performing monochrome pixel-based photographing, and the remaining one from among the first camera and the second camera is a camera for performing RGB pixel-based photographing.

According to various embodiments, the processor may use a monochrome pixel-based correction scheme as at least a part of the first designated correction scheme, and may use an RGB pixel-based correction scheme as at least a part of the second designated correction scheme.

According to various embodiments, the processor may perform: as the monochrome pixel-based correction scheme, correcting an image obtained by monochrome pixel-based photographing, using images, the number of which is a first value; and as the RGB pixel-based correction scheme, correcting an image obtained by RGB pixel-based photographing, using images, the number of which is a second value that is greater than the first value.

An electronic device according to various embodiments may include a first camera that performs monochrome pixel-based photographing, a second camera that performs RGB pixel-based photographing, a memory, and a processor. The processor may obtain a first image having a first brightness corresponding to an external object, using the first camera, may obtain a plurality of second images having a second brightness corresponding to the external object using the second camera, may generate an image that is corrected to have a brightness corresponding to the first brightness based at least on the plurality of second images having the second brightness, and may generate a composite image corresponding to the external object based at least on at least a part of the first image having the first brightness and at least a part of the corrected image.

Figure 4:
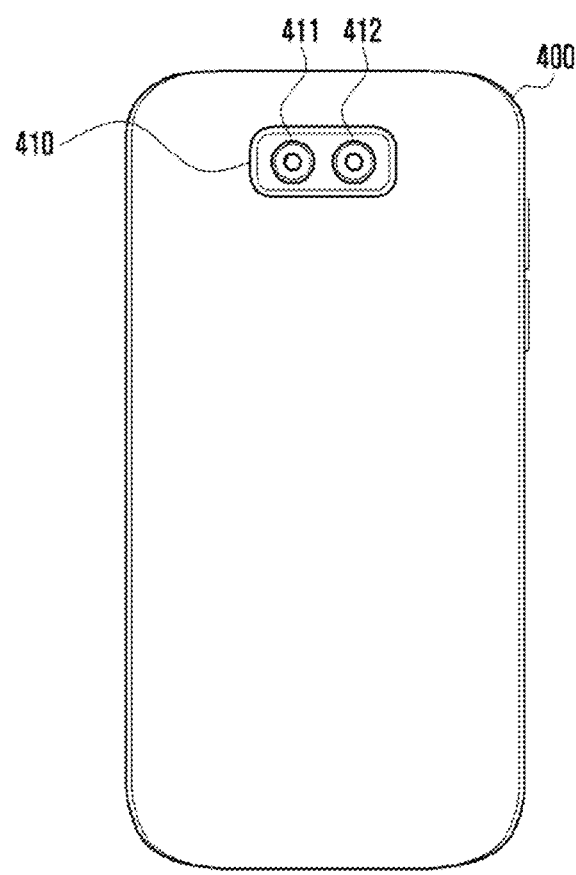
FIG. 4 illustrates a diagram of the appearance of an electronic device equipped with a plurality of cameras according to various embodiments.

FIG. 4 illustrates a diagram of the appearance of an electronic device equipped with a plurality of cameras according to various embodiments.

Referring to FIG. 4, an electronic device 400 (e.g., the electronic device 101) may include a camera module 410 (e.g., the camera module 180), and the camera module 410 may include a plurality of cameras. For example, the camera module 410 may include a first camera 411 and a second camera 412. The first camera 411 and the second camera 412 may be synchronized. Although the electronic device 400 of FIG. 4 is illustrated such that two cameras are included in a single camera module 410, the present disclosure is not limited thereto.

According to various embodiments, the electronic device 400 may photograph a first image of a predetermined subject using the first camera 411, and may photograph a second image of the predetermined subject using the second camera 412. According to various embodiments, the first camera 411 and the second camera 412 may have different magnification ratios. The fact that the magnification ratios are different may indicate that F-values corresponding to the cameras (e.g., an F number, a value indicating the brightness of a camera lens, or a value indicating the amount of light received) are different. The amount of light received via the first camera 411 and the amount of light received via the second camera 412 during the same exposure time may be different. For example, as the F-value is decreased, the amount of light received by a camera may be increased, and the brightness of an image photographed by the camera may become brighter. According to various embodiments, the first camera 411 and the second camera 412 may have different view angles. For example, when the view angle of the first camera 411 may be broader than the view angle of the second camera 412, and the amount of light received by the first camera 411 may be greater than that of the second camera 412. For example, the expression "a view angle is broad" may indicate that "the amount of light received (e.g., the amount of light received by a camera) is large", and "an F-value is small".

According to various embodiments, the first camera 411 and the second camera 412 may be disposed in the front side or the back side of the electronic device 400 such that the first camera 411 and the second camera 412 may photograph the same subject. According to various embodiments, the electronic device 400 may be equipped with the first camera 411 and the second camera 412, such that the first camera 411 and the second camera 412 are disposed in the same side from among the front side and the back side. According to various embodiments, the first camera 411 and the second camera 412 may be disposed in the upper portion, the middle portion, the lower portion, or the like of the electronic device 400, and their positions are not limited to a predetermined position.

Figure 5:
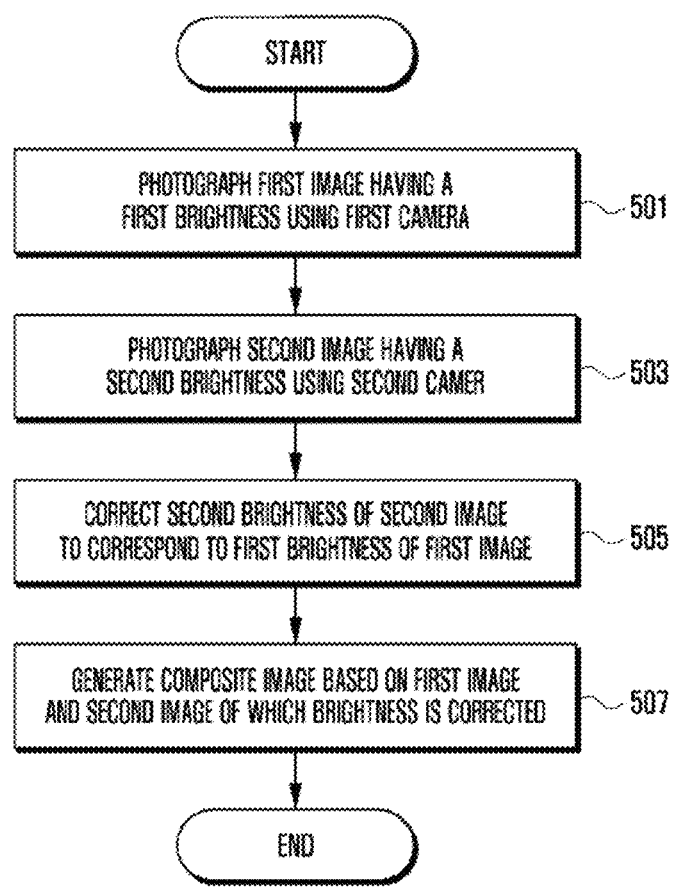
FIG. 5 illustrates a diagram of a method of combining a plurality of images based on a plurality of cameras according to various embodiments.

FIG. 5 illustrates a flowchart of a method of combining a plurality of images based on a plurality of cameras according to various embodiments.

Referring to FIG. 5, in operation 501, a processor (e.g., the processor 120 of FIG. 1) of an electronic device (e.g., the electronic device 101 of FIG. 1) may photograph a first image having a first brightness, using a first camera (e.g., the first camera 310 of FIG. 3) included in a camera module (e.g., the camera module 180 of FIG. 1). In operation 503, the processor 120 may photograph a second image having a second brightness using a second camera (e.g., the second camera 320 of FIG. 3) included in the camera module 180. The first camera 310 and the second camera 320 have different magnification ratios, and may receive different amounts of light via lenses of the cameras during the same exposure time. The fact that the magnification ratios are different may indicate that the first camera 310 and the second camera 320 have different view angles. An F-value corresponding to the first camera 310 (e.g., an F number, a value indicating the brightness of a camera lens, or a value indicating the amount of light received) may be different from an F-value corresponding to the second camera 320. The fact that an F-value is small may indicate that the amount of light received is large. For example, when the F-value corresponding to the first camera 310 is smaller than the F-value corresponding to the second camera 320, a first image photographed by the first camera 310 may be output to be brighter than a second image photographed by the second camera 320. According to various embodiments, the first image with a first brightness may be brighter than the second image with a second brightness.

In operation 505, the processor 120 may correct the second brightness of the second image to correspond to the first brightness of the first image. According to various embodiments, the processor 120 may determine the number of frames of the second image, based on a difference in the brightness between the first image and the second image. For example, the processor 120 may compare the first brightness of the first image and the second brightness of the second image, and may identify a difference in the brightness between two images. Based on the identified difference in the brightness, the processor 120 may determine the number of frames of the second image.

According to various embodiments, the processor 120 may correct the second brightness of the second image based on the number of frames determined. The corrected second brightness of the second image may be implemented to have a brightness similar to the first brightness of the first image. For example, when a difference in the brightness between the first image and the second image corresponds to a two-time difference (e.g., when the brightness of the first image is two times brighter than the brightness of the second image), the number of frames of the second image used to correct the second image may be two times greater than the number of frames of the first image, theoretically. According to various embodiments, the processor 120 may correct the first image based on frames (e.g., frames of the first image), the number of which is a first value. The processor 120 may correct the second image based on frames (e.g., frames of the second image), the number of which is a second value which is greater than the first value.

According to various embodiments, depending on a photographing environment, the number of frames of the second image that the processor 120 needs may be smaller than the number of frames that is theoretically used. The processor 120 may correct the second brightness of the second image to have a brightness similar to the first brightness of the first image, based on frames, the number of which is smaller than the number of frames theoretically used. According to various embodiments, the processor 120 may determine the number of frames of the second image, based on a difference in the brightness between the first image and the second image.

According to various embodiments, the processor 120 may correct the second brightness of the second image based on the number of frames determined. For example, the number of frames determined is four, the processor 120 may correct the second brightness of the second image based on the four frames. The second image of which the brightness is corrected may have a brightness similar to the first brightness of the first image. According to various embodiments, when a value corresponding to the first brightness of the first image is determined, and, within the error range of the determined value, a value corresponding to the second brightness of the second image is measured, it is determined that the first brightness of the first image and the second brightness of the second image are similar. The error range may be determined during designing, and a user may hardly recognize a difference in brightness between images with the naked eye, within the error range.

According to various embodiments, the operation of correcting the second image may be an operation of reducing noise corresponding to the second image. The processor 120 may correct the second image based on the number of frames determined, whereby the second image may be implemented to be brighter and the noise corresponding to the second image may be reduced.

In operation 507, the processor 120 may generate a composite image based on the first image and the second image of which the brightness is corrected. According to various embodiments, to combine the first image and the second image, the processor 120 may control the first brightness of the first image and the second brightness of the second image to be similar to each other. Also, the processor 120 may reduce the noise corresponding to the second image, whereby the noise corresponding to the first image and the noise corresponding to the second image may be controlled to be similar to each other.

According to various embodiments, the processor 120 may correct the second image such that the second brightness of the second image becomes similar to the first brightness of the first image, and may generate a composite image based on the first image and the second image of which the brightness is corrected. According to various embodiments, the processor 120 may determine the number of frames corresponding to the second image, based on a difference in the brightness between the first image and the second image, and may correct the second image based on the number of frames determined.

Figure 6A:
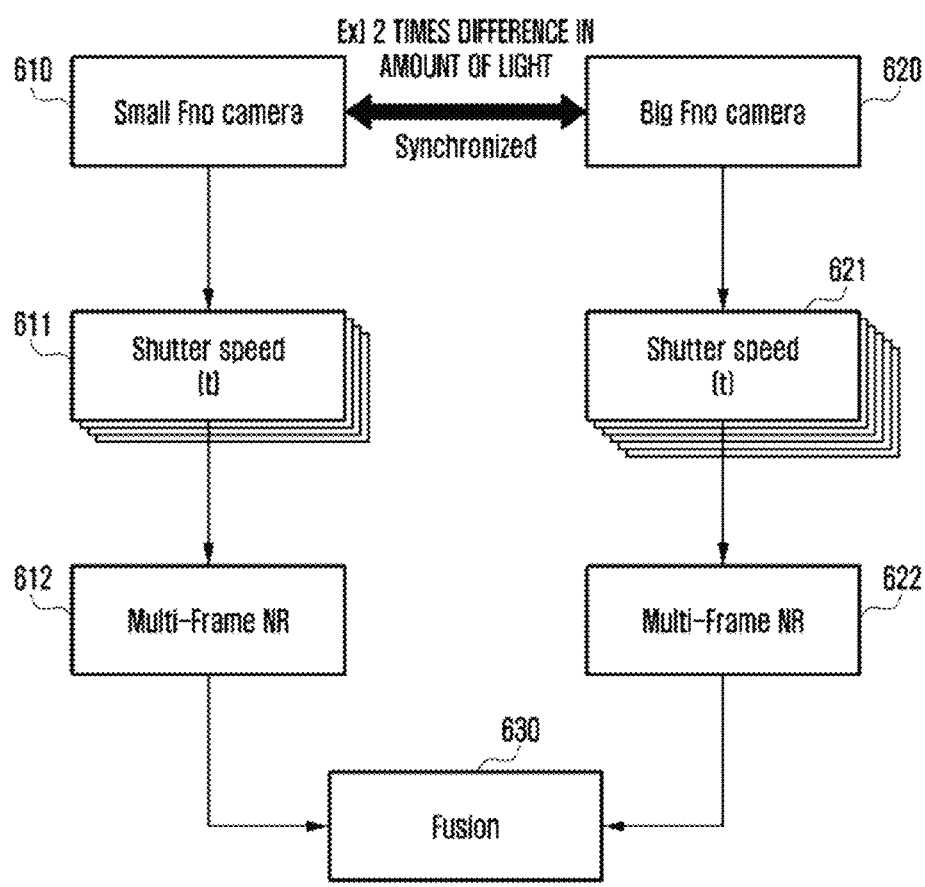
FIGS. 6A and 6B illustrate diagrams of an embodiment of combining a plurality of images based on a plurality of cameras according to various embodiments.
Figure 6B:
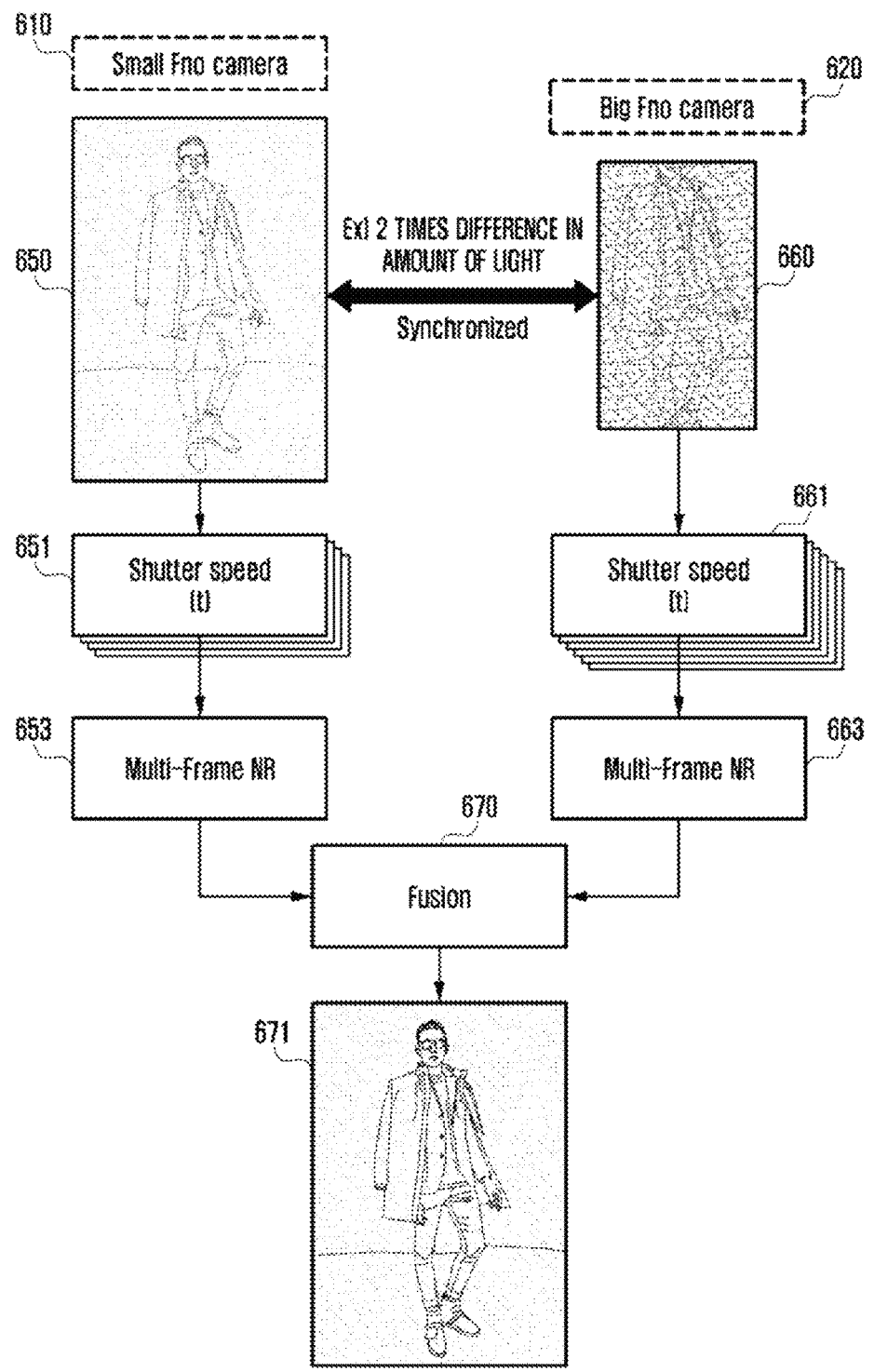

FIGS. 6A and 6B illustrate diagrams of embodiments of combining a plurality of images based on a plurality of cameras according to various embodiments.

FIG. 6A illustrates a process of generating a composite image based on a first camera 610 having a relatively lower F-value and a second camera 620 having a relatively higher F-value. For example, the first camera 610 has a F-value smaller than that of the second camera 620, and may receive the amount of light (e.g., the amount of light reception), which is two times larger than that of the second camera 620 during the same exposure time. Conversely, the second camera 620 has an F-value larger than that of the first camera 610, and the amount of light reception may be a half of the amount of light reception of the first camera 610 during the same exposure time. The brightness of a first image photographed by the first camera 610 may be two times brighter than the brightness of a second image photographed by the second camera 620. An exposure time corresponding to the first camera 610 may be a first exposure time, and an exposure time corresponding to the second camera 620 may be a second exposure time. The first exposure time and the second exposure time may be the same.

The shutter speed (a photographing speed or an exposure time) of the first camera 610 and the second camera 620 may be set to be the same. The shutter speed may be the amount of time taken while a shutter disposed between an image sensor and a lens of a camera is opened and closed. The shutter speed may be expressed as seconds. Light is received when the shutter is open and thus, as the shutter speed is short, the amount of light reception is low. For example, a photographed image corresponding to a shutter speed of 1/1000 s may be darker than a photographed image corresponding to a shutter speed of 1/250 s. According to various embodiments, the shutter speed for the first camera 610 and the shutter speed for the second camera 620 may be set to be the same within an error range. The error range may be determined during designing, and a user may hardly recognize a difference in brightness between images with the naked eye, within the error range.

According to various embodiments, the first camera 610 and the second camera 620 may obtain four frames per second. The processor 120 may combine the first image photographed using the first camera 610 and the second image photographed using the second camera 620. In order to combine the first image and the second image, the processor 120 may correct the first image and the second image such that the brightness of the first image and the brightness of the second image are similar to each other. The second image is darker than the first image, and thus, a larger number of frames may be used when image correction is performed. For example, the brightness of the second image corresponds to a half of the brightness of the first image and thus, theoretically, frames of the second image, the number of which is two times larger than the number of frames of the first image, may be used in order to correct the second image. According to various embodiments, the processor 120 may determine the number of frames of the second image, based on the brightness of the first image. According to various embodiments, the number of frames may be determined to be smaller than the number of frames theoretically used. According to various embodiments, the number of frames to be processed is reduced and thus, the memory to be used and the processing time may be reduced.

In operation 611, the first camera 610 may correct the first image based on four frames. In operation 621, the second camera 620 may correct the second image based on six frames by adding two more frames. The processor 120 may generate a corrected image corresponding to the first image in operation 612, and may generate a corrected image corresponding to the second image in operation 622. A process of correcting an image may be a process of controlling the brightness of the second image to be similar to the brightness of the first image, or may be a process of reducing noise of the second image to be similar to noise of the first image. The second image with a relatively smaller amount of light reception may have a relatively larger amount of noise than that of the first image. Operations 612 and 622 may be a noise reduction (NR) process with respect to multiple frames. That is, the operations may be a process of reducing noise included in the first image and the second image, in order to combine the first image and the second image.

In operation 630, the processor 120 may generate a composite image by combining the corrected first image and the corrected second image. According to various embodiments, the processor 120 may generate a composite image, of which the brightness is similar to the brightness of the first image and of which the noise corresponding to the second image is reduced.

FIG. 6B illustrates, in detail, a process of generating a composite image based on the first camera 610 having a relatively lower F-value and the second camera 620 having a relatively higher F-value.

The processor 120 of the electronic device 101 may photograph a predetermined subject (e.g., a person) using the first camera 610 and the second camera 620. The magnification ratios of the first camera 610 and the second camera 620 may be different from each other. When photographing is performed during the same exposure time, a first image 650 photographed by the first camera 610 and a second image 660 photographed by the second camera 620 may have different brightness and different photographing ranges. For example, the first image 650 photographed by the first camera 610 may include the shape of the subject, but the second image 660 photographed by the second camera 620 may include at least a part of the subject. The brightness of the first image 650 photographed by the first camera 610 may be approximately two times brighter than the brightness of the second image 660 photographed by the second camera 620. The electronic device 101 according to various embodiments may photograph a plurality of images using a plurality of cameras, and may generate a single composite image by combining the plurality of images.

The processor 120 may control the brightness of the second image 660 based on the brightness of the first image 650, in order to combine the first image 650 and the second image 660. For example, the processor 120 may correct the second image 660 based on a plurality of frames corresponding to the second image 660, in order to control the brightness of the second image 660. The processor 120 may correct the first image 650 based on four frames corresponding to the first image 650 in operation 651, and may correct the second image 660 based on six frames corresponding to the second image 660 in operation 661. According to various embodiments, the brightness of the second image 660 is darker than that of the first image 650 and thus, the number of frames used for correcting the second image 660 may be larger than the number of frames used for correcting the first image 650. According to various embodiments, the processor 120 may determine the number of frames used for correcting the second image 660, based on the brightness of the first image 650. According to various embodiments, the processor 120 may correct the second image 660 based on frames, the number of which is smaller than the number of frames theoretically used. According to various embodiments, the number of frames to be processed for correcting the second image 660 is smaller than the number of frames theoretically used, and thus, the memory used for frame processing and the frame processing time may be reduced.

Referring to operations 653 and 663, the process of correcting the first image 650 and the second image 660 may be a process of reducing noise corresponding to the first image 650 and the second image 660.

In operation 670, the processor 120 may generate a composite image 671 based on the first image 650 and the corrected second image 660. According to various embodiments, the composite image 671 may be displayed to be clearer since the brightness is similar to that of the first image 650 and noise is removed from the first image 650 and the second image 660.

FIGS. 7A to 7D illustrate diagrams of embodiments of combining images corresponding to an RGB color according to various embodiments.

Figure 7A:
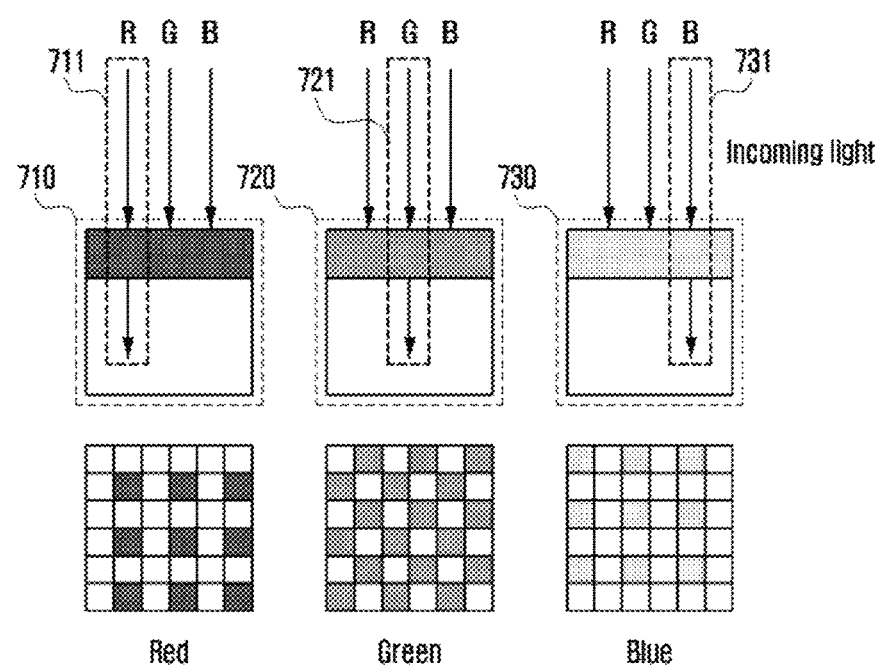
FIGS. 7A to 7D illustrate diagrams of an embodiment of combining images corresponding to an RGB color according to various embodiments.

FIG. 7A is a diagram illustrating the amount of light reception corresponding to an RGB pixel for displaying color. The RGB pixel may be divided as three colors, that is, red, green, and blue. The amount of received light corresponding to each color may be approximately ⅓ of the total amount of light reception. The RGB pixel may be divided as an R filter 710 corresponding to red, a G filter 720 corresponding to green, and a B filter 730 corresponding to blue. The R filter 710 may receive ⅓ of the total amount of light, so as to represent red. The G filter 720 may receive ⅓ of the total amount of light, so as to represent green, and the B filter 730 may receive ⅓ of the total amount of light, so as to represent blue. As described above, an electronic device (e.g., the electronic device 101 of FIG. 1) receives approximately ⅓ of the total amount of light, and thus, the brightness of a displayed image may be dark. That is, the image may include high noise.

Figure 7B:
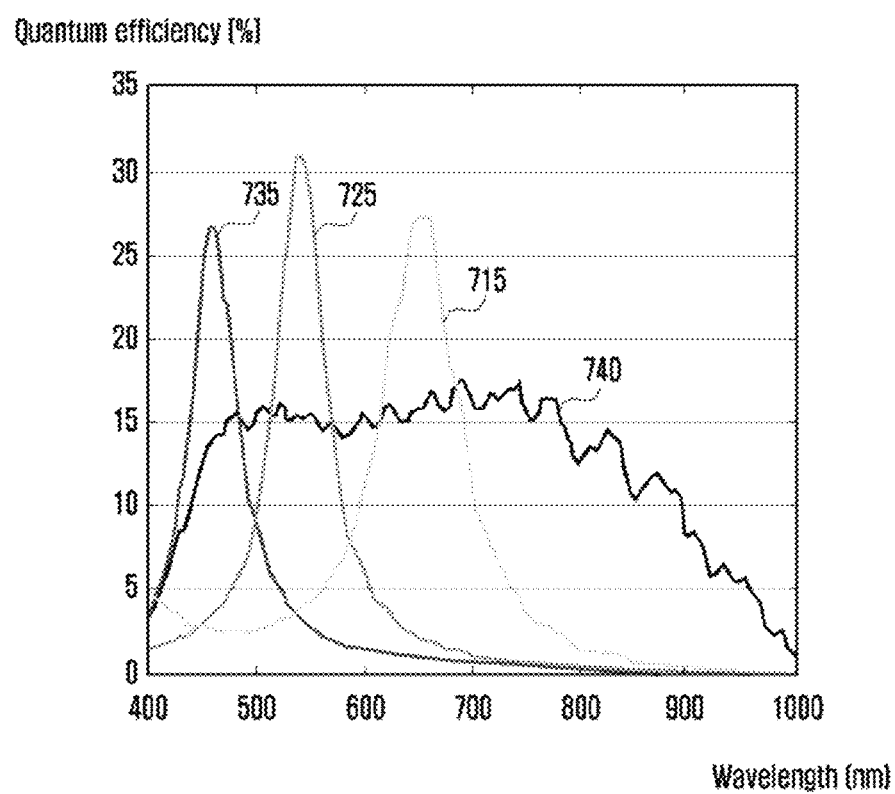

FIG. 7B is a graph illustrating the transmissivity of light to an RGB pixel and a monochrome pixel. An RGB pixel may represent colors such as red, green, blue, or the like, and a monochrome pixel may represent one color. Referring to a graph, the x-axis indicates wavelengths, and the y-axis indicates quantum efficiency (e.g., the amount of light received or the amount of light reception). The RGB pixel may represent red 715, green 725, blue 735, or the like, based on a wavelength section (400 to 760 nm) corresponding to a visible ray. For example, the RGB pixel may receive light corresponding to the set wavelength section, and may not receive light outside the set wavelength section. According to various embodiments, the RGB pixel may receive light corresponding to approximately ⅓ of the amount of light reception of the monochrome pixel 740, for each color, such as red 715, green 725, and blue 735. According to various embodiments, the amount of light reception corresponding to the RGB pixel 715, 725, and 735 may be smaller than the amount of light reception corresponding to the monochrome pixel 740. According to various embodiments, since the amount of light reception is small, an image corresponding to the RGB pixel may be displayed to be darker than an image corresponding to the monochrome pixel 740. According to various embodiments, to combine the image corresponding to the monochrome pixel 740 and the image corresponding to the RGB pixel, images corresponding to the RGB pixels are obtained by performing photographing many times and image correction is performed based on the plurality of images obtained by performing photographing many times. The electronic device 101 according to various embodiments may generate a composite image by combining the image corresponding to the monochrome pixel 740 and the corrected image corresponding to the RGB pixel.

Figure 7C:
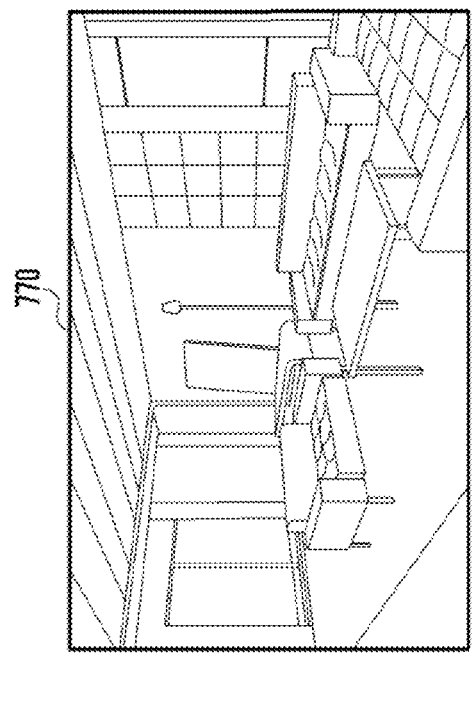
Figure 7C:
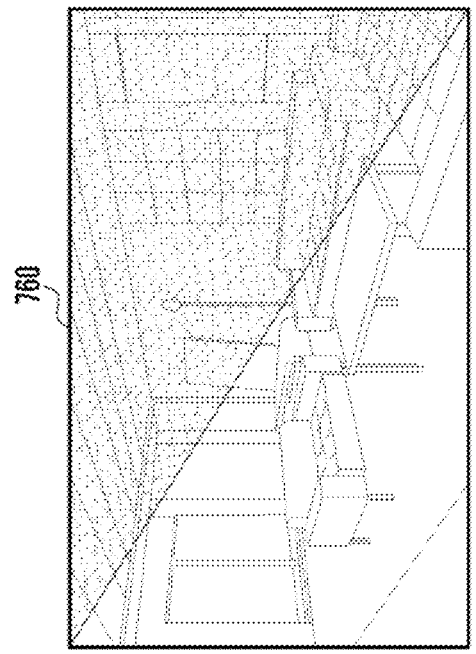

FIG. 7C illustrates a normally photographed image and a composite image obtained based on a monochrome pixel and an RGB pixel.

Referring to FIG. 7C, when an electronic device (e.g., the electronic device 101 of FIG. 1) performs photographing without a process of combining a plurality of images, the electronic device 101 may display a first image 760 in which a part including the color corresponding to the RGB pixel is displayed to be dark. The amount of light reception of the area corresponding to the RGB pixel is decreased to ⅓ of the total amount of light reception, and thus, the area corresponding to the RGB pixel may be displayed to be dark. According to various embodiments, the electronic device 101 photographs a plurality of frames to display the area corresponding to the RGB pixel to be bright, and may correct the brightness of the area corresponding to the RGB pixel based on the plurality of photographed frames.

According to various embodiments, the electronic device 101 may correct the brightness of the area corresponding to the RGB pixel based on frames, the number of which is smaller than the number of frames theoretically used to correct the brightness. For example, when the brightness of the first image 760 is two times brighter than the brightness of the area corresponding to the RGB pixel, four frames may be used to correct the brightness, theoretically. According to various embodiments, the present disclosure may correct the brightness of the area corresponding to the RGB pixel based on, for example, two frames, the number of which is smaller than four frames. According to various embodiments, since the number of frames to be processed is reduced, the electronic device 101 may save the memory (e.g., the memory 130 of FIG. 1) corresponding to the frames to be processed, and may reduce frame processing time.

According to various embodiments, the electronic device 101 may combine the first image 760 and the area corresponding to the RGB pixel of which the brightness is corrected, and may generate a composite image 770. The color corresponding to the RGB pixel in the composite image 770 may be clearly displayed.

Figure 7D:
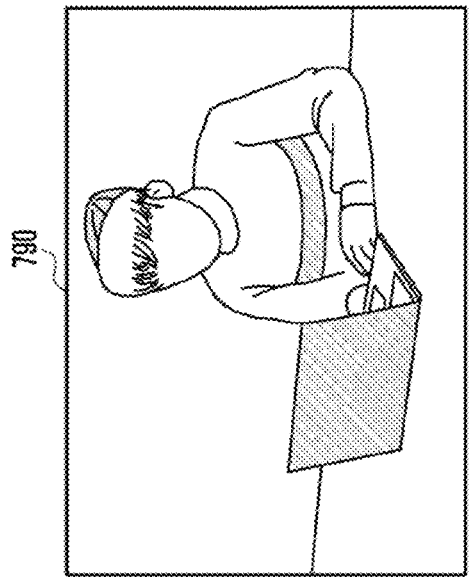
Figure 7D:
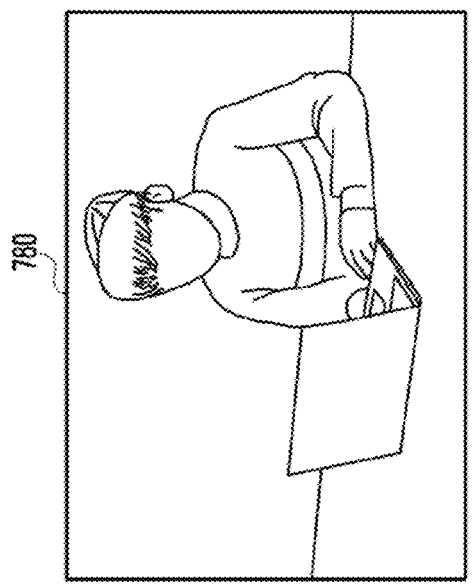

FIG. 7D illustrates a composite image obtained based on an infrared ray (IR) sensor and a color camera. Referring to FIG. 7D, the electronic device 101 may photograph a predetermined subject based on an infrared ray sensor (e.g., a camera that performs photographing based on an infrared ray) and a color camera (e.g., an RGB camera). According to various embodiments, the amount of light reception of the color camera corresponds to approximately ⅓ of the total amount of light, and thus, noise may occur in the area corresponding to color, and the area corresponding to color may be displayed to be dark. Referring to FIG. 7D, the electronic device 101 may output a first image 780 in which the color of a subject is unclear.

According to various embodiments, the electronic device 101 may perform photographing to obtain a plurality of frames using the color camera, and may correct the brightness of a color camera-based image based on the plurality of frames obtained via photographing. For example, the electronic device 101 may correct the brightness of the color camera-based image, based on the brightness of an image photographed based on the infrared ray sensor. The operation of correcting the brightness of the image may indicate an operation of reducing noise of an image. For example, reducing noise of an image may indicate an operation of correcting the brightness of the image such that the color of the image is displayed to be clear. According to various embodiments, the electronic device 101 may compare the brightness of an infrared ray sensor-based image and the brightness of a color camera-based image, and may determine the number of frames corresponding to the color camera based on a comparison result. According to various embodiments, the electronic device 101 may correct an image based on frames, the number of which is smaller than the number of frames theoretically used.

According to various embodiments, the electronic device 101 may combine the first image 780 photographed based on the infrared ray sensor and the corrected image obtained by correcting the image photographed by the color camera. According to various embodiments, the electronic device 101 may generate a composite image 790 of which the color is displayed to be clearer than that of the first image 780.

A method according to various embodiments of the present disclosure may obtain a first image having a first brightness and corresponding to an external object using a first camera having a first view angle, may obtain a plurality of second images having a second brightness and corresponding to the external object using a second camera having a second view angle narrower than the first view angle; may generate an image that is corrected to have a brightness corresponding to the first brightness based at least on the plurality of second images having the second brightness, and may generate a composite image corresponding to the external object based at least on at least a part of the first image having the first brightness and at least a part of the corrected image.

The operation of obtaining the first image, according to various embodiments, may include obtaining the first image based on a first exposure time set for the first camera, and the operation of obtaining the plurality of second images may include obtaining the plurality of second images based on a second exposure time, which is set for the second camera and is substantially the same as the first exposure time.

According to various embodiments, the first camera has a first f-number, and the second camera has a second f-number greater than the first f-number. According to various embodiments, the operation of obtaining the plurality of second images may include determining the number of the plurality of second images, based at least on a difference between the first f-number and the second f-number.

The operation of generating the corrected image, according to various embodiments, may include correcting at least the part of the plurality of second images based at least on the number of the plurality of second images.

The method according to various embodiments may further include: correcting a first noise corresponding to the first image using a first designated correction scheme; and correcting a second noise corresponding to at least the part of the plurality of second images using a second designated correction scheme.

The operation of correcting the first noise, according to various embodiments, may include, as at least a part of the first designated correction scheme, correcting the first noise using images, the number of which is a first value; and the operation of correcting the second noise may include, as at least a part of the second designated correction scheme, correcting the second noise using images, the number of which is a second value that is greater than the first value.

According to various embodiments, one of the first camera and the second camera is a camera for performing monochrome pixel-based photographing, and the remaining one from among the first camera and the second camera is a camera for performing RGB pixel-based photographing.

According to various embodiments, a monochrome pixel-based correction scheme is used as at least a part of the first designated correction scheme, and a RGB pixel-based correction scheme is used as at least a part of the second designated correction scheme. The method according to various embodiments may further include: as a monochrome pixel-based correction scheme, correcting an image obtained by monochrome pixel-based photographing, by using images, the number of which is the first value; and as an RGB pixel-based correction scheme, correcting an image obtained by RGB pixel-based photographing, by using images, the number of which is the second value greater than the first value.

A method according to various embodiments may obtain a first image having a first brightness corresponding to an external object, using the first camera that performs monochrome pixel-based photographing, may obtain a plurality of second images having a second brightness corresponding to the external object using the second camera that performs RGB pixel-based photographing, may generate an image that is corrected to have a brightness corresponding to the first brightness based at least on the plurality of second images having the second brightness, and may generate a composite image corresponding to the external object based at least on at least a part of the first image having the first brightness and at least a part of the corrected image.

According to various embodiments, there may be provided a computer-readable recording medium that records a program for implementing a method of combining a plurality of images in a computer, and the method may obtain a first image having a first brightness and corresponding to an external object using a first camera having a first view angle, may obtain a plurality of second images having a second brightness and corresponding to the external object using a second camera having a second view angle narrower than the first view angle, may generate an image corrected to have a brightness corresponding to the first brightness based at least a part of the plurality of second images having the second brightness, and may generate a composite image corresponding to the external object based at least on at least a part of the first image having the first brightness and at least a part of the corrected image.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device for combining images, comprising:
   a first camera including a first view angle;
   a second camera including a second view angle that is smaller than the first view angle;
   a memory; and
   a processor,
   wherein the processor is configured to:
      obtain a first image corresponding to an external object, wherein the first image is captured by the first camera based on a first brightness;
      obtain a plurality of second images corresponding to the external object, wherein the plurality of second images are captured by the second camera based on a second brightness;
      determine a number of the plurality of second images based on a difference between the first brightness and the second brightness;
      generate an image that is corrected to have a brightness corresponding to the first brightness based on the number of the plurality of second images; and
      generate a composite image corresponding to the external object based on at least a part of the first image having the first brightness and at least a part of the corrected image.

2. The electronic device of claim 1, wherein the processor is further configured to:
   obtain the first image based on a first exposure time set for the first camera; and
   obtain the plurality of second images based on the first exposure time.

3. The electronic device of claim 1, wherein the first camera has a first f-number, the second camera has a second f-number that is greater than the first f-number, and the processor is further configured to determine the difference between the first brightness and the second brightness based on a difference between the first f-number and the second f-number.

4. The electronic device of claim 1, wherein the processor is further configured to:
   correct a first noise corresponding to the first image using a first designated correction scheme; and
   correct a second noise corresponding to at least the part of the plurality of second images using a second designated correction scheme.

5. The electronic device of claim 4, wherein the processor is further configured to:
   as at least a part of the first designated correction scheme, correct the first noise using a first number of images; and
   as at least a part of the second designated correction scheme, correct the second noise using a second number of images, wherein the second number is larger than the first number.

6. The electronic device of claim 1, wherein one of the first camera and the second camera is a camera for performing monochrome pixel-based photographing, and the remaining one from among the first camera and the second camera is a camera for performing RGB pixel-based photographing.

7. The electronic device of claim 6, wherein the processor is further configured to:
   use a monochrome pixel-based correction scheme as at least a part of a first designated correction scheme for correcting a first noise corresponding to the first image; and
   use an RGB pixel-based correction scheme as at least a part of a second designated correction scheme for correcting a second noise corresponding to at least the part of the plurality of second images.

8. The electronic device of claim 7, wherein the processor is configured to:
   as the monochrome pixel-based correction scheme, correct an image obtained by monochrome pixel-based photographing, using a first number of images; and
   as the RGB pixel-based correction scheme, correct an image obtained by RGB pixel-based photographing, using a second number of images, wherein the second number is larger than the first number.

9. A method for combining images, comprising:
   obtaining a first image corresponding to an external object, wherein the first image is captured by a first camera including a first view angle based on a first brightness;
   obtaining a plurality of second images corresponding to the external object, wherein the plurality of second images are captured by a second camera including a second view angle smaller than the first view angle based on a second brightness;
   determining a number of the plurality of second images based on a difference between the first brightness and the second brightness;
   generating an image that is corrected to have a brightness corresponding to the first brightness based on the number of the plurality of second images; and
   generating a composite image corresponding to the external object based on at least a part of the first image having the first brightness and at least a part of the corrected image.

10. The method of claim 9, wherein the obtaining the first image comprises obtaining the first image based on a first exposure time set for the first camera; and
   the obtaining the plurality of second images comprises obtaining the plurality of second images based on the first exposure time.

11. The method of claim 9, wherein the first camera has a first f-number;
   the second camera has a second f-number greater than the first f-number; and
   the determining the difference between the first brightness and the second brightness is based on a difference between the first f-number and the second f-number.

12. The method of claim 9, further comprising:
   correcting a first noise corresponding to the first image using a first designated correction scheme; and
   correcting a second noise corresponding to at least the part of the plurality of second images using a second designated correction scheme.

13. The method of claim 12, wherein the correcting the first noise comprises, as at least a part of the first designated correction scheme, correcting the first noise using a first number of images; and the correcting the second noise comprise, as at least a part of the second designated correction scheme, correcting the second noise using a second number of images, wherein the second number is larger than the first number.

14. The method of claim 9, wherein one of the first camera and the second camera is a camera for performing monochrome pixel-based photographing; and the remaining one from among the first camera and the second camera is a camera for performing RGB pixel-based photographing.

15. The method of claim 14, further comprising:

as a monochrome pixel-based correction scheme, correcting an image obtained by monochrome pixel-based photographing, by using a first number of images; and as an RGB pixel-based correction scheme, correcting an image obtained by RGB pixel-based photographing, by using a second number of images, wherein the second number is larger than the first number, wherein the monochrome pixel-based correction scheme is used as at least a part of a first designated correction scheme for correcting a first noise corresponding to the first image, and the RGB pixel-based correction scheme is used as at least a part of a second designated correction scheme for correcting a second noise corresponding to at least the part of the plurality of second images.

16. A non-transitory computer-readable recording medium embodying a computer program for operating an electronic device, the electronic device comprising a first camera including a first view angle, a second camera including a second view angle smaller than the first view angle, and at least one processor, the computer program comprising instructions that, when executed by the at least one processor, cause the electronic device to:

obtain a first image corresponding to an external object, wherein the first image is captured by the first camera based on a first brightness;

obtain a plurality of second images corresponding to the external object, wherein the plurality of second images are captured by the second camera based on a second brightness;

determine a number of the plurality of second images based on a difference between the first brightness and the second brightness;

generate an image corrected to have a brightness corresponding to the first brightness based on the number of the plurality of second images; and generate a composite image corresponding to the external object based on at least a part of the first image having the first brightness and at least a part of the corrected image.

17. The non-transitory computer-readable recording medium of claim 16, wherein the computer program further comprises instructions that, when executed by the at least one processor, cause the electronic device to:

obtain the first image based on a first exposure time set for the first camera; and obtain the plurality of second images based on the first exposure time.

18. The non-transitory computer-readable recording medium of claim 16, wherein the first camera has a first f-number, wherein the second camera has a second f-number greater than the first f-number, and wherein the computer program further comprises instructions that, when executed by the at least one processor, cause the electronic device to:

determine the difference between the first brightness and the second brightness based on a difference between the first f-number and the second f-number.

\* \* \* \* \*